Figure 1:
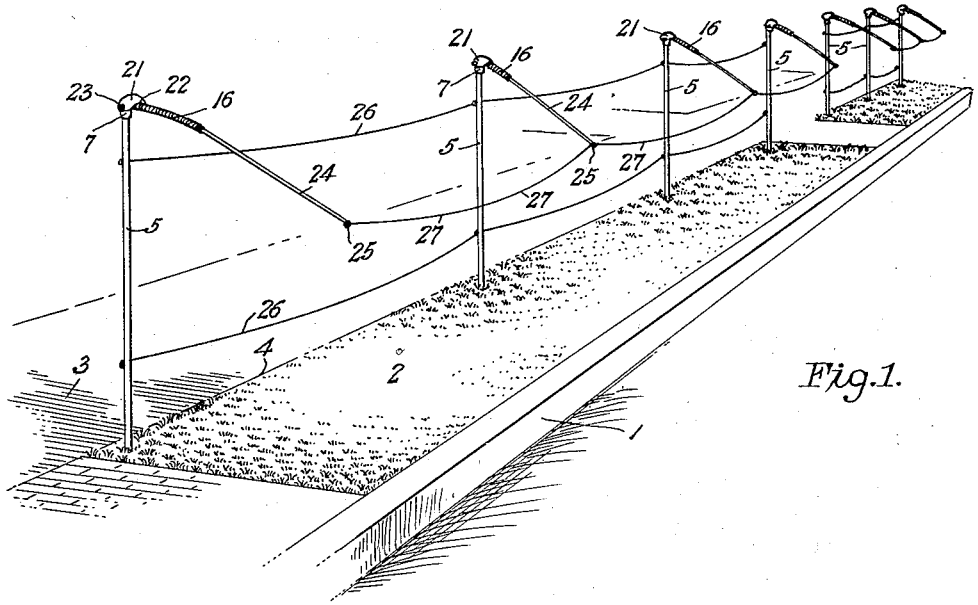

May 24, 1932.  J. M. HAVERSTICK  1,859,509
ORNAMENTAL FENCE
Filed Aug. 6, 1931  2 Sheets-Sheet 1

Inventor
JOHN M. HAVERSTICK
By Parker Cook
Attorney

May 24, 1932.    J. M. HAVERSTICK    1,859,509
ORNAMENTAL FENCE
Filed Aug. 6, 1931    2 Sheets-Sheet 2
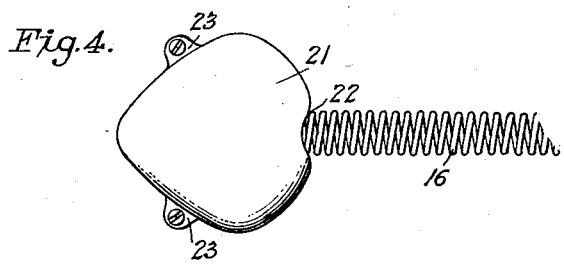
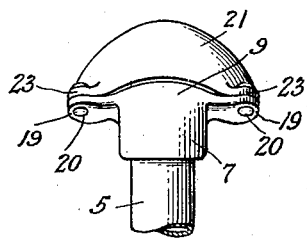
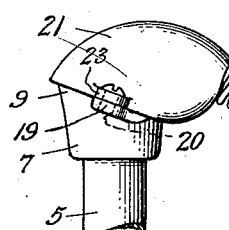
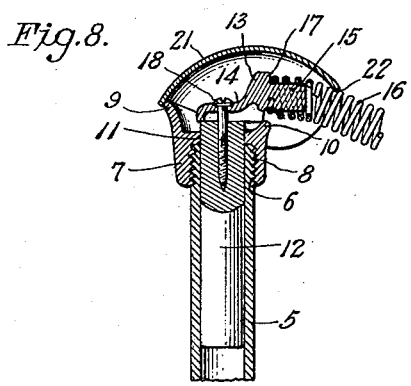
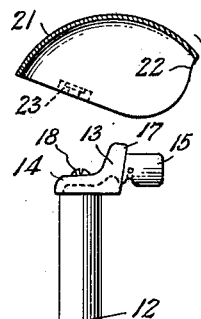
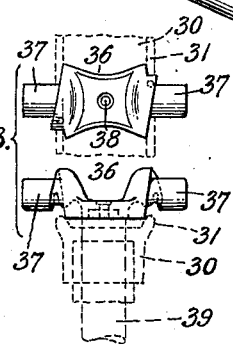
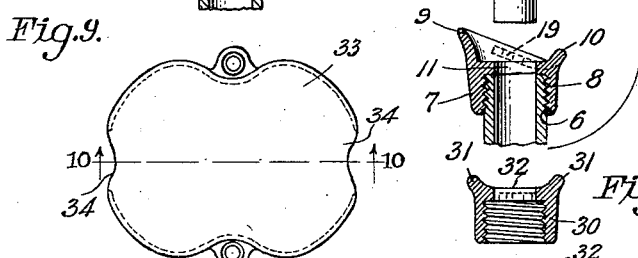
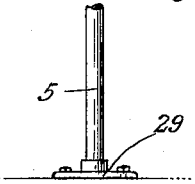
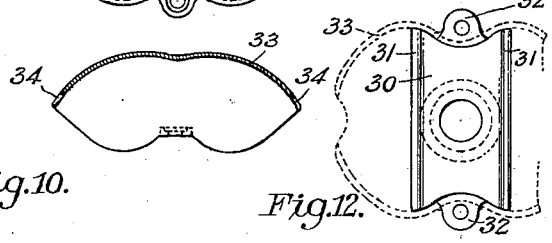
Inventor
JOHN M. HAVERSTICK
By Parker Cook.
Attorney Patented May 24, 1932

1,859,509

UNITED STATES PATENT OFFICE

JOHN M. HAVERSTICK, OF VENTNOR CITY, NEW JERSEY

ORNAMENTAL FENCE

Application filed August 6, 1931. Serial No. 555,583.

My invention relates to new and useful improvements in ornamental fences and more particularly to a fence that is especially adapted to protect the strip of lawn that is often grown between the sidewalk and the curbing.

It is well known that grass is particularly hard to grow in sandy soil, such as along the sea coast, and much time and effort is often used to grow and keep green the lawns about the house, as well as the grass strips between the curbing and the sidewalk.

However, automobilists in drawing up to the curb often step from the car onto this grass strip, and it is impossible to keep the same green and in good condition with people walking all over it.

Furthermore, baby coaches and other child's vehicles are often parked on this grass strip, which not only harms the grass but further disfigures the entire looks of the residence.

One of the objects of the present invention, therefore, is to provide a plurality of especially constructed posts from which flexible arms project, so that a small rope can be threaded through these arms, the arms in turn extending outwardly over the grass plot to warn pedestrians and act as a guard or fence to keep them off the grass plot between the curbing and the sidewalk.

Still another object of the invention is to provide a fence that is more of a warning than an obstruction, that is, it will consist of a plurality of posts, depending upon the length of the grass strip, from which flexible arms extend, through which arms there is threaded a rope, so that automobilists, when driving up to the curb, may hit the rope, or may step into the rope, but will not strain the fence, as the flexible arms will give with the impact and stay in their bent position until the machine or person moves from contact with the rope.

Still another object of the invention is to provide a fence consisting of a plurality of posts that may be quickly planted adjacent the sidewalk, along which posts will be placed a rope or ropes, which may be tight, while extending out from the posts overhanging the grass strip will be the flexible arms, and the rope draped between the arms, the fence acting as a warning to pedestrians to "keep off". If, however, the pedestrian walks into the same, it will not trip him, nor will it put any great strain on the fence.

Still another object of the invention is to provide a fence wherein the posts may have oppositely extending spring arms, as sometimes the plot of grass between the curbing and the sidewalk is greater in width than would be covered by an overhanging arm of practical length.

Still another object of the invention is to provide a fence of this nature wherein the posts consist simply of iron pipes, which may be decorated or painted in bright colors, and wherein a socket or head piece which holds the flexible arm may be quickly screwed in position on the pipe, so that the posts and, in fact, the completed fence, is one that may be cheaply made and easily assembled.

With these and other objects in view, the invention consists in certain new and novel arrangements and combination of parts as will be hereinafter more fully explained and pointed out in the claims.

Figure 2:
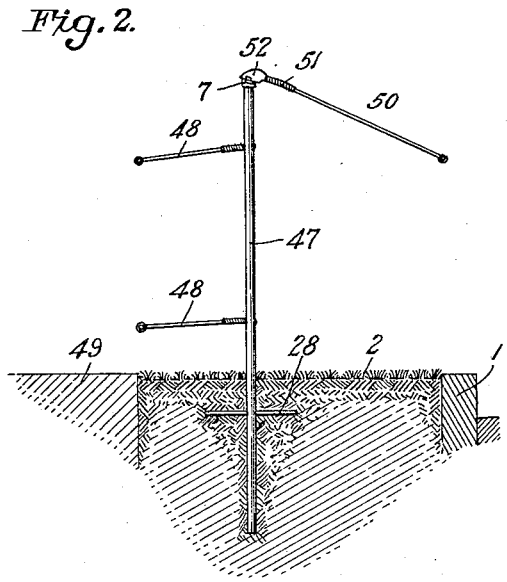
Figure 3:
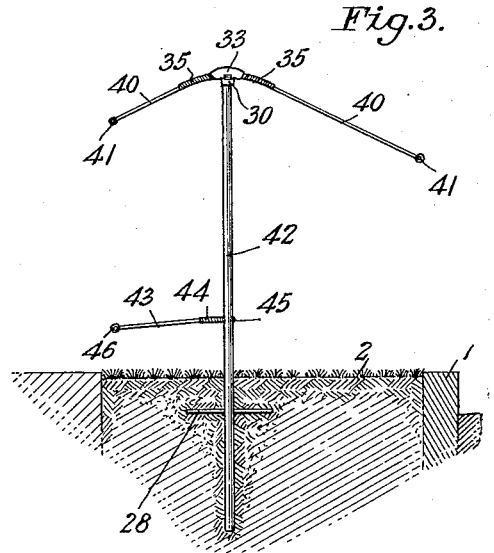

Referring now to the drawings showing a preferred form and two modifications,

Fig. 1 is a perspective view showing the preferred form of fence adjacent the sidewalk and overhanging the strip of grass between the sidewalk and the curb, Fig. 2 is a view partly in section showing a slightly modified form of post, the post planted in a strip between the sidewalk and the curb, Fig. 3 is a view partly in section showing another slightly modified form of post, Fig. 4 is a detailed top plan view of the head piece or casting. showing the spring in which one of the arms is to be positioned, Fig. 5 is a fragmentary side elevation showing a part of the post, the socket and spring, and a part of an arm within the spring, Fig. 6 is a fragmentary rear view of the socket or casting fitted on the post, Fig. 7 is a view showing how the relative parts of the socket and spring support are assembled, Fig. 8 is a sectional view of the same parts, showing the parts in their assembled position, Fig. 9 is a top plan view of a slightly modified form of head piece or cap, Fig. 10 is a sectional view taken on line 10—10 of Fig. 9, Fig. 11 is a sectional view of a part of the socket or casting of the form shown in Fig. 3, Fig. 12 is a top plan view of the same, Fig. 13 is a detail of the flexible arm support as used with the modified form of socket shown in Figs. 11 and 12, and Fig. 14 is a slightly modified form of base for the post.

Referring now more particularly to the drawings and to Fig. 1 for the moment, there is shown the ordinary strip of curbing 1, the grass plot 2 and the sidewalk 3. Now to protect this grass plot from pedestrians, baby carriages and automobilists, the ornamental fence is placed along the edge 4 of the sidewalk. As will be seen, it comprises a plurality of posts 5 and ropes, and as the posts are all alike, a description of the one will be a description of the other.

As may be seen, a piece of iron pipe is preferably utilized, of the desired length, which may be threaded as at 6, (see Fig. 8), on which is in turn threaded the casting or socket 7, which, as may be seen, is internally threaded as at 8, while its rear portion 9 extends slightly above its forward edge 10. This casting has the central opening 11, in which is fitted a wooden plug 12. Now secured to this wooden plug 12 is the small arm holding member 13, which has the small rearwardly extending wing 14, and the outwardly extending lug 15, which in turn is designed to slip within the rear end of a spring 16.

As may be seen, the rear end of the spring 16 will fit over the lug 15. There is a shoulder 17 to limit the position of this spring 16 on the lug, while the wing 14 is held to the plug 12 by the screw 18, all of which is illustrated in Fig. 8.

Referring for the moment to Fig. 6, it will be seen that the casting or socket 7 is also provided with the outwardly extending ears 19, which are provided with screw threaded openings as at 20 for the reception of the screws to secure the cap 21, which is partly rounded, as may be seen in the several figures, and which is cut out slightly in its forward edge, as at 22.

This cap 21 is also provided with the outwardly extending ears 23 so that this cap may be screwed to the ears 19 of the casting 7.

By having the cap 21 of the shape shown, it will be seen that it holds the spring 16 at a slight angle from the horizontal.

Slipped within this spring 16 is a wooden arm or rod 24, which is provided at its outer end with the little eyelet 25, so that a rope may be placed therethrough.

In Fig. 1 I have shown a plurality of these posts 5 set at the desired distance apart, and strung between these posts are the two ropes 26. These ropes may be painted any desired color, and in practical application I have painted these ropes, as well as the fence posts, in a brilliant carmine or red, which, as it may be readily perceived, make a pretty contrast with the green lawn.

Now through the eyelets 25 at the ends of the arms 24 is also strung the rope 27, and this may drape, as may be seen in Fig. 1, in a pleasing manner, the weight of the rope bending the spring members 16, also slightly downwardly, so that the arms 24 are never in a horizontal position.

It will be understood that it is desirable to have these arms inclined from the horizontal, so that if an automobile draws up to the curb and the lamps or the fenders project over the grass plot and should strike the arms 24, there is no danger of the arm breaking the glass in the lamps or marring the fenders, and in the same way if a pedestrian for any reason should walk into the ends of the arms, or step from the automobile into them, there is no danger of the arm striking him with the point, but on the other hand will bend downwardly at a further angle to the horizontal.

Again, by forming spring holders for the arms 24, it will be seen that these arms 24 may swing to the right or to the left, or upwardly or downwardly, or in any direction, to thus let the rope 27 give freely on contact.

As before mentioned, this rope 27 is to be more of a warning than to form an impasse.

The ropes 26, however, are to be strung tightly, as they are to keep pedestrians from stepping off the sidewalk onto the grass plot.

The posts 5 are to be stuck into the ground for a desired length and may be provided with a cross piece 28, as shown in the modified forms in Figs. 2 and 3 to more firmly anchor the posts, if desired.

Also, instead of planting the posts in the ground, there might be a flat base 29, as shown in Fig. 14. The purpose of having a flat base is that at times it might be desired to put up this fence in a hall or show room, or any place where it would be impractical to stick the posts into a floor.

Now the grass plot 2 might be greater in width than would be protected by the preferred form of posts and arms, as shown in Fig. 1, so to allow for such a condition, I may use two outwardly extending arms and a double head or socket, which will now be described.

Referring to Figs. 9 to 13 inclusive, and for the moment to Figs. 11 and 12, there will be seen a socket 30 which is to be threaded, of course, onto a pipe or standard, and in this instance the socket has the two upstanding rims 31 that are in parallel planes. In a like manner to the preferred form of socket, there are the two oppositely positioned ears 32, so the head piece or cap 33 may be fastened thereon. This cap 33 is slightly cut out as at 34, on its opposite ends, to bear against, in this instance, (Fig. 3) the oppositely positioned spring members 35.

In Fig. 13 I have shown the little member 36 for holding these spring arms, which may be a small casting with the two upwardly extending portions from which will extend the lugs 37 which are similar to the lug of the preferred form, as shown in Fig. 8.

There will be a hole 38, through the base of this little member, so that it may be fastened to the wooden plug 39, which plug, of course, will fit down in the post or standard. The cap 33 will likewise bear down on the springs 35 to hold them at an angle from the horizontal, and in Fig. 3 I have shown the arms 40, that fit within the springs 35, of different lengths, that is, one arm, the outer arm, greater in length than the inner arm, but it will be understood that should the grass plot be of such width that two long arms 40 should be used, it is just a matter of placing a longer arm 40 within the spring 35.

The outer ends of the arms 40 will be provided with the little eyelets 41 for the reception of the rope, as in the preferred form.

Also, in Fig. 3, instead of placing a rope like the rope 26 directly against the post 42, I also put a short arm 43 within the spring holder 44, which spring holder is secured to the post 42, as at 45. This arm will have the eyelet 46 and be directly under the arm 40, and although I have not shown ropes placed through these eyelets, it will be understood that they are to be threaded therethrough in the same manner.

Now in Fig. 2 showing a still further slightly modified form, there is the post 47, and in this instance there are two arms 48 extending towards the sidewalk 49, through which ropes will be secured, and there is also shown the overhanging arm 50 within its spring 51. In this instance there is just the single casting or socket 52.

Thus, it will be seen that should the grass plot be greater in width than could be covered by the preferred form of fence, I may use either of the two modified forms, and although I have not shown the ropes strung within the arms, for these modified forms, it will be understood that they will appear just as in the preferred form, with the exception that the two ropes on the one side of the posts are spaced out from the posts, rather than up against them.

From the foregoing, it will be seen that I have provided a fence that may be cheaply manufactured and readily assembled. As heretofore mentioned, old pipe stock may be used, which may be painted any color desired, while the threading of the stock and the placing of the casting and the little arms is but the matter of a moment. After the posts are up, the ropes may be strung with but little effort, to thus complete the assembly.

Furthermore, by providing either a single head or socket or double socket, I can use the two overhanging arms to thus take care of any reasonable width of grass plot between the sidewalk and the curb.

It will be seen that the fence is one that is highly ornamental in appearance, adding beauty to its surroundings, and not only will it add beauty, but it will act as a deterrent or warning to pedestrians and automobilists to keep off the grass plot.

Finally, the fence is high enough so that in the dark a pedestrian will not trip over the same, which is often the case when little stakes, say a foot high, are stuck in the ground, and a wire connected to the stakes. In fact, this latter form of fence is often prohibited in cities and municipalities.

Many slight changes might be made without departing in any way from the spirit and scope of the invention.

Having thus described my invention what I claim as new and desire to secure by Letters Patent is:

1. A fence comprising a plurality of posts, cables strung between said posts, each of said posts provided with a flexible spring member located at its top, and an arm in each of said spring members and a cable strung between the said arms.

2. A fence comprising a plurality of posts, cables strung between said posts, each of said posts also provided with an angularly positioned spring member at its top, an overhanging arm fitted within each of said spring members, a further cable draped through the outer ends of said arms, whereby the last-mentioned cable will move inwardly if pressure be exerted thereon.

3. A fence comprising a plurality of posts spaced at desired intervals, cables attached to said posts, and the said cables being substantially taut, flexible inclined outwardly extending arms adapted to overhang a grass plot, a further cable stretched between said last-mentioned arms and said cable being draped whereby the said last-mentioned cable and arms will readily move under impact.

4. A fence comprising a plurality of posts, cables strung between said posts and spaced outwardly from said posts, said cables being substantially taut, a flexible outwardly extending arm secured to the top of each post, and a cable secured to the outer ends of said arms and adapted to overlap a grass plot, and said cable adapted to readily give under impact.

5. A fence comprising a plurality of uprights, arms mounted for universal movement on said posts, cables secured to the outer ends of said arms and draped between the posts and said cables and arms adapted to readily give under impact.

6. A fence post for an ornamental fence comprising an upright, a casting secured on top of said upright, a flexible outwardly extending spring member secured in said casting, a cap also secured to said casting and contacting with the upper portion of said spring member to thereby hold it at an angle from the horizontal and said spring member adapted to receive a cable supporting arm.

7. A post for an ornamental fence comprising a metal pipe, a socket secured on the upper edge of said pipe, a plug in said socket, an outwardly extending spring member secured to said plug, a cap secured to said socket and bearing on said spring member to thereby hold it at an angle to the horizontal, and a cable carrying arm fitting within said spring.

8. A post for an ornamental fence, a socket secured to the upper end of said post, a lug member in said socket, an outwardly extending spring secured on said lug, a cap on said socket bearing against said spring member and a cable carrying arm in said spring member.

9. A post for an ornamental fence, a socket on said post, a double lug member in said socket, a spring member secured to each of said lugs, a cap on said socket and bearing on the said spring members to hold them at an angle from the horizontal, and overhanging cable carrying arms in said spring members.

10. An ornamental fence post, outwardly extending flexible springs secured to the one side of said post, an outwardly extending spring member secured to the upper end of said post and cable carrying arms within said spring members.

11. A post for an ornamental fence comprising a flexible arm mounted at the top thereof and extending outwardly therefrom, a similarly mounted flexible arm of shorter length than said first-mentioned arm and extending diametrically opposite from the first-mentioned arm.

12. A fence of an ornamental nature adapted to be disposed between the sidewalk and the curb, comprising a plurality of posts, cables spaced outwardly from each other and loosely supported to readily give under impact, supporting means for said cables having a universal movement and said supporting means inclined downwardly with relation to the horizontal.

13. A fence of an ornamental nature comprising a plurality of ornamented posts, said posts adapted to be disposed between the sidewalk and the curbing, cables attached to the posts and in close proximity to the edge of the sidewalk adjacent the curb, outwardly extending flexibly mounted arms on said posts and a cable draped through the outer end of said arms and adapted to overlie the said curb.

14. An ornamental fence adapted to be disposed between a sidewalk and a curb, including posts, flexible means extending from the posts, and disposed in the opposite directions, cables draped between the respective flexible means on each side of the posts, one of said cables adapted to overlie the edge of the sidewalk, and the other of said cables adapted to overlie the edge of the curb.

15. An ornamental fence post having a socket at its upper end, outwardly extending ears on said socket, a spring holding means on said socket, a flexible spring held by said means, an arm fitting within said flexible means and adapted to support a cable, a cap having ears adapted to be secured to the ears of the socket, and the said cap holding said spring member at an angle from the horizontal.

In testimony whereof I affix my signature.

JOHN M. HAVERSTICK.